July 30, 1957 R. A. STEFFEN 2,800,946
LAMINATING METHOD AND APPARATUS
Filed Jan. 29, 1953 2 Sheets-Sheet 1
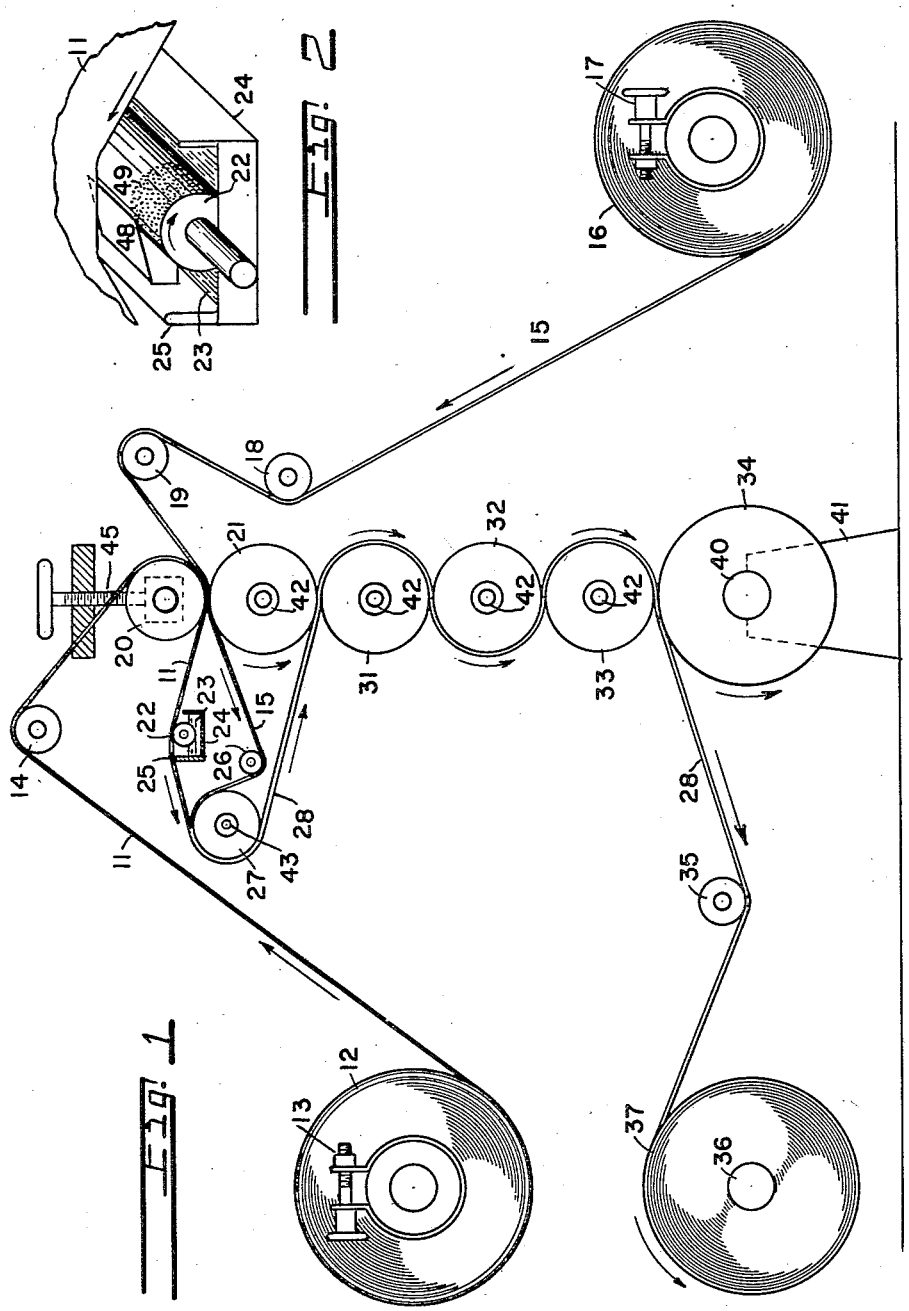
Inventor
RAYMOND A. STEFFEN
By Frederick G. L. Boyer
Attorney July 30, 1957

R. A. STEFFEN 2,800,946

LAMINATING METHOD AND APPARATUS

Filed Jan. 29, 1953

Inventor
RAYMOND A. STEFFEN
By Frederick C. L. Boyer
Attorney

United States Patent Office 2,800,946
Patented July 30, 1957

2,800,946

LAMINATING METHOD AND APPARATUS

Raymond A. Steffen, Hamilton, Ohio, assignor to The Champion Paper and Fibre Company, Hamilton, Ohio, a corporation of Ohio Application January 29, 1953, Serial No. 333,914

9 Claims. (Cl. 154—37)

This invention relates to the lamination of paper, in web form, and to methods and machinery for this purpose. It is particularly concerned with the manufacture of laminated webs in which it is desired that one or both surfaces shall possess greater than usual smoothness so that it shall be adapted to receive high grade printing and to other uses requiring superior flatness, smoothness and/or gloss. It has particular utility in making laminated papers in which one or both of the surface layers is to be formed of a supercalendered printing paper, either coated or uncoated, and it is especially valuable in those cases in which the extremely smooth high gloss paper known in the trade as "cast coated paper" is to be used for one or both of the outer layers or laminae.

Paper is laminated for a variety of purposes such as the production of thicker sheets or webs than can conveniently be made on the paper machine, the provision of a different type or higher quality surface layer on one or both sides, the provision of a backing layer or middle layer of greater strength, and for other reasons. In the laminating process as conventionally performed, particularly when aqueous adhesives are used, high finished smooth surfaced papers such as supercalendered and cast coated papers lose their smoothness and gloss to a considerable extent and acquire an appearance sometimes described as "leathery" or "cockly." The surfaces of the usual laminated paper webs are, for this reason, not as well adapted to receive high grade printing as were the same surfaces before passing through the laminating process. It is also generally recognized that lamination normally causes a definite loss in the fold endurance of paper. Laminating processes as commonly used are also slower than much of the modern paper handling machinery.

It is accordingly the primary object of the present invention to provide a method and apparatus which will make possible the production of laminated paper webs in one operation at high speed, with either aqueous or non-aqueous adhesives, without damaging the smoothness, flatness, and gloss and printing quality of even the smoothest, most highly finished, and best printing papers.

I have now found it possible to accomplish these objects and not only prevent injury to the surface finish but even to increase the smoothness and flatness, and, in many cases, to increase rather than decrease the fold endurance, in the laminating process. These results can be secured, I have discovered, by holding the paper under high and substantially uniform tension from a time prior to the application of adhesive until after the setting and drying of the adhesive is substantially complete; by applying the adhesive with a dipping roll and immediately thereafter wiping off the surplus, by passing the web, while so held under tension, over the dipping roll and a round-edged doctor; by alternately holding the opposite sides of the combined web tightly against smooth polished surfaces during the drying; and by periodically subjecting the combined web to pressure between rolls. The high and uniform tension required for this purpose can, I find, be conveniently secured by passing the separate and combined webs through successively lower nips between rolls of substantial diameter arranged in superposed relationship, with the weight of all the rolls wholly or partially supported by the journals of the lowermost roll, to which power is applied, which rotates the overlying rolls by frictional engagement therebetween.

The invention will be further described by reference to the accompanying drawing in which:

Fig. 1 is a diagrammatic illustration of a laminating machine made and operated in accordance with the present invention.

Fig. 2 is a pictorial representation of a portion of the adhesive applying device showing the method of keeping the edges of the web free from adhesive.

Fig. 3 is a diagrammatic illustration of a machine arranged to combine three layers of paper or the like.

Figure 3:
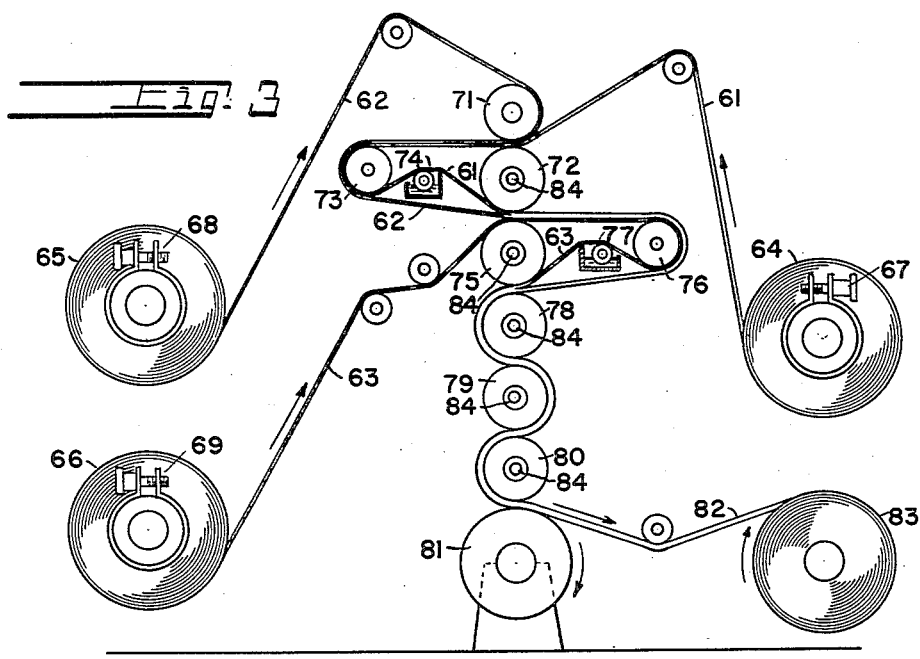

Referring first to Fig. 1, a web 11 of paper or the like is shown being unwound from a roll 12 under control of a friction brake 13. It passes over a fly roll 14 which guides the web into the laminator. Similarly another web 15 is shown being unwound from a roll 16 under control of a brake 17 and being guided by fly rolls 18, 19 into the laminator. Both webs then pass together through the nip between the uppermost rolls 20 and 21 in the laminator. After passing between these two rolls the webs are conducted along separate paths, web 11 being led up over a roll 22 which is rotated by means not shown in a pool 23 of adhesive contained in a pan 24 and over a round edged doctor blade 25 which removes the surplus adhesive applied by roll 22 and returns this surplus to the pan 24. Meanwhile, the web 15 is conducted under a roll 26 and then the two webs are adhesively united as they wrap around a roll 27 which guides the combined web 28 into the nip between rolls 21 and 31 after which it passes around roll 31 between rolls 31 and 32, around roll 32 between rolls 32 and 33, around roll 33 and between rolls 33 and 34. It is then guided by a fly roll 35 to a known type of winder 36 where it is wound into a roll 37.

Each of the rolls 20, 21, 31, 32, and 33 normally rests with its full weight upon the roll below, although if it is desired to reduce the pressure exerted on the web a part of the weight of one or more of the rolls can be carried by any of the known devices for reducing the pressure in nips between rolls, although care should be taken to be certain that there is a substantial pressure in each nip. The roll 34 is in turn supported on its journals 40 by suitable bearing members indicated diagrammatically at 41, and normally carries the full weight of all the rolls in the stack. This roll 34 is rotated in the direction of the arrow by conventional driving means, not shown. Rolls 33, 32, 31, 21, and 20 are rotated therefrom by contact friction. These rolls are preferably made of hard metal such as chill-cast iron or other suitable hard surfaced metal and are smooth and polished. In order to accelerate the drying of the adhesive applied to the web, the rolls which it contacts may be internally heated, as by steam, for which purpose steam connections 42 are provided to each of rolls 21, 31, 32, and 33. If desired roll 27 may also be heated in like manner by means of steam supplied through connection 43. If necessary for adequate drying additional heated rolls may be provided.

Sometimes webs to be laminated are found to be thicker at one edge than at the other. A screw 45 may, if desired, be provided at each end of the uppermost roll 20, to compensate for such differences in thickness when required.

In the drawing the single paper webs 11 and 15 are indicated by a double line. Where the two webs are together but not glued they are indicated separately but after they have been glued together they are illustrated as a single web of double the thickness, no line being drawn to separate the combined web into its constituent laminae.

With the device, as so far described, there might be sometimes a tendency for a bead of adhesive to be pressed out from between the webs at their edges, which might transfer to and build upon the rolls in an objectionable manner. To prevent this danger, edge wipers 48 may be provided at each edge of the web. As illustrated more clearly in Fig. 2, these wipers lie against the roll 22, wiping the layer of adhesive material 49 which is picked up from pool 23 from the surface of roll 22 for a short distance each way from the edge of the paper web, so that there is a narrow strip at each edge of the paper web, to which no adhesive is applied. Then in pressing the webs together the adhesive is not squeezed out beyond the edges and the rolls remain clean.

In operation of the device described tension on webs 11 and 15, prior to their passage through the nip between rolls 20 and 21, is provided by the friction brakes 13 and 17, respectively. From the point where the webs pass between rolls 20 and 21, to the point where they issure from between rolls 33 and 34, I have found them to be held under a high tension which remains substantially constant during operation. While the cause for this high and uniform tension is not fully understood, it is believed to result, at least in part, from the application of power to the lowermost roll and the driving of each superposed roll by friction exerted through the web from one surface to the opposite surface, thus tending to pull the web through each nip at a speed slightly higher than that at which it passed through the preceding nip. By passing both webs between rolls 20 and 21 before applying the adhesive, the web 11 is pulled over roll 22 and doctor 25 at high tension so that the amount of adhesive actually left on the web is substantially no more than is required to cause adequate adhesion. In using adhesives such as dextrine, I find that if used at from 40 to 50 percent solids the amount left on the webs by the process described, is about six pounds dry weight per ream, which appears to be the correct amount to give the desired adhesion. The amount of moisture thus added to the web is small enough that the web can normally be reduced to the desired moisture content in passing over the heated rolls illustrated and described.

I have found it possible, by this method to successfully produce laminated webs at speeds of from 400 up to 1000 feet per minute depending on the character, weight, and moisture content of the webs to be laminated, on the character and moisture content required in the laminated web, on the amount of drying available in the apparatus, and other factors.

As one example of the practice of the present invention, two webs of a folding grade of high finish cast coated paper were combined in the manner described. Each web carried a high gloss cast surfaced coating of about 12.5 pounds per ream and had a total coated weight of 66 pounds per ream (500 sheets, 25 x 38 inches). They were combined with about 6 pounds per ream of dextrine adhesive applied at a solids content of about 45 percent. Before laminating, the single sheet had a Schopper fold endurance of 161 in the machine direction and 293 in the cross direction. The laminated product was a paper weighing 138 pounds per ream and having a cast surface on each side. In smoothness and flatness of surface it was notably superior to the papers before lamination, and the Schopper fold was increased to 390 in the machine direction and 1004 in the cross direction— in marked contrast to the reduction in fold endurance normally expected to result from the laminating process. The reason for the increased smoothness and flatness is imperfectly understood but it is thought that any unevenness and cockles in the original single webs are stretched out and flattened by the high tension to which the paper is subjected in this process. They are pressed and glued together while so flattened, forming a heavier sheet which resists the efforts of the cockles and irregularities to return. The high tension by which they are held against the surfaces of the rolls 31, 32, and 33, while drying is also believed to contribute to the final smoothness and flatness of the laminated web. The reason for the increased folding endurance is not understood, though the tendency of this method of laminating to increase the smoothness and flatness of the surfaces appears to contribute something to the folding endurance which it is possible to obtain in laminated webs of a given smoothness.

As another example of the practice of the present invention, a web of extra strong high finished cast coated paper carrying about 15 pounds of coating and having a total weight of about 90 pounds per ream (500 sheets 25 x 38 inches) was laminated to a web of folding quality paper board weighing about 140 pounds per ream, in the manner described, the adhesive being applied to the thinner web. The combined web weighed about 236 pounds per ream and had a thickness of about 0.015 inch. It had excellent folding properties, the folding endurance as measured on the M. I. T. folding tester was 306 in the machine direction and 461 in the cross direction. The coated side was of excellent printing quality, being notably smoother than before laminating, contrary to the usual experience in laminating cast coated papers to paper board. It was substantially free from the "leathery" "hubbly" appearance commonly found on such papers laminated by conventional processes. The finished product was eminently suited for the highest grades of folding boxes, match book covers, and the like.

In still another example of the practice of the invention, two webs of supercalendered, coated-one-side paper carrying about 13 pounds of coating on that side and having a total weight of about 100 pounds per ream (500 sheets 25 x 38 inches) were combined back to back in the manner described. The combined web weighed about 206 pounds per ream. It was a good quality of coated two side paper such as is useful for post cards, cover stock, and the like. The surface did not have the extremely high finish and gloss of the cast coated papers previously described but was a good supercalendered surface, having smoothness, flatness, gloss, and surface character at least as good as, and in some respects superior to, the same properties of the component webs before laminating.

The method and apparatus disclosed can be readily adapted to the combining of more than two webs in one operation. In Fig. 3, is shown, for example, an embodiment of the invention which is arranged to combine three webs. Webs 61, 62, and 63 are supplied from rolls 64, 65, and 66 under control of friction brakes 67, 68, and 69, respectively. Webs 61 and 62 are passed together between rolls 71 and 72 and around roll 73. The two webs are then separated and web 61 passes over adhesive applying device 74 which may be similar in all respects to that described in connection with Fig. 1. The two webs 61 and 62 are then adhesively joined in the nip between rolls 72 and 75. The web 63 also passes through this nip and around roll 76 along with the combined webs 61—62 but is not at that time adhesively joined thereto. After passing roll 76, web 63 is conducted along a path separate from that of the combined webs, and adhesive is applied thereto by an applying device 77. Web 63 is then adhesively joined to the combined web 61—62, in the nip between rolls 75 and 78. The triplex web 82 then passes around and between rolls 78, 79, 80, and 81 and is finally wound into a roll at 83 in the manner described. The rolls 72, 75, 78, 79, and 80 are provided with steam connections 84 so that they may be internally heated to accelerate the drying of the combined web 82. It will be observed that in this arrangement the actual adhesive combining of the webs takes place between rolls 72 and 75 and rolls 75 and 78 which are in, rather than apart from, the main stack. It is obvious that, if it is desired to adhesively combine the webs around the fly rolls 73 and 76, that this can be accomplished by introducing all three webs into the nip between rolls 71 and 72 and applying the adhesive to the lower side of the upper web in each case as the three webs are travelling from the main stack towards the respective fly rolls 73 and 76, as is done in the device illustrated in Fig. 1. It will further be noted that the adhesive in each case applied to the outer layers (61 and 63) which are then adhesively contacted with the inner layer (62). This device is thus adapted to give especially uniform results in those cases in which two identical outer layers are applied to an inner layer of different character.

Figure 4:
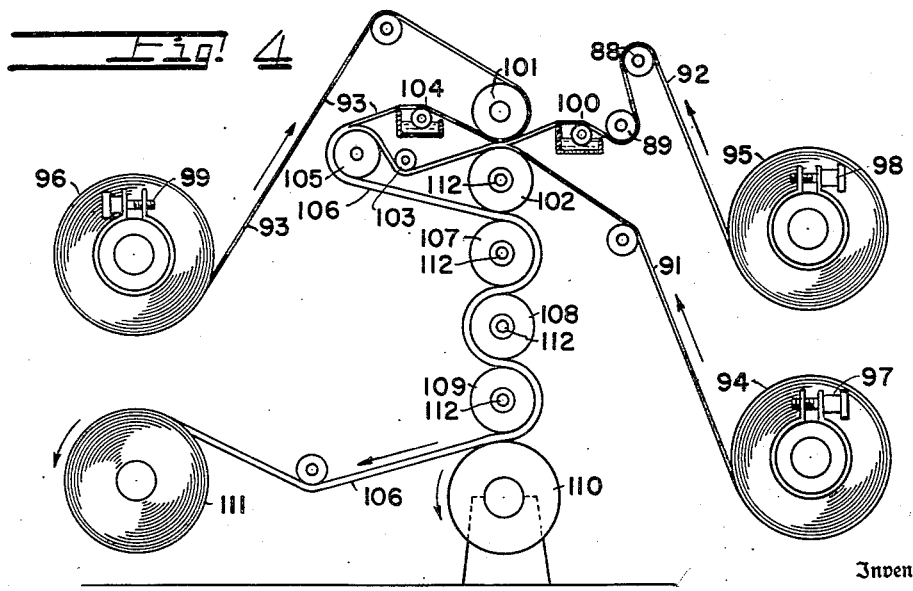
Fig. 4 is a diagrammatic illustration of a modified form of apparatus for combining three webs.

An alternative embodiment of the invention as adapted for producing a triplex laminated web is illustrated in Fig. 4. In this modification, webs 91, 92, and 93 are shown being unwound from rolls 94, 95, and 96, under control of friction brakes 97, 98, and 99, respectively. The inner layer 92, is directed by guide rolls 88 and 89 over the adhesive applying unit 100 (which may be in all respects similar to that described in connection with Fig. 1) and into the nip between rolls 101 and 102 where it is adhesively united with the first outer lamina 91. The web 93 which is to form the other external lamina is guided around top roll 101 of the stack and passes through the nip between rolls 101 and 102 along with the webs 91 and 92, but is not at that time adhesively united therewith. After passing through this nip the united webs 91—92 are guided around guide roll 103 while web 93 is guided along a separate path, over adhesive applying unit 104 which may be identical with unit 100. The adhesive coated web 93 is then adhesively united with the combined web 91—92 around roll 105, from which the triplex web 106 passes around and between rolls 102, 107, 108, 109, and 110, as shown, and is finally wound into a roll at 111, in the manner previously described. As in the previous embodiments, steam connection 112 may be provided for internally heating rolls 102, 107, 108, and 109 to accelerate drying of the combined web. In this case the tension on central web 92 where it passes over adhesive applying device 100, is maintained by means of the brake 98. This may be of value in cases where the character of the central web is such as to require a decidedly different tension over the applying device 100 in order that the required amount of adhesive may be applied.

In Figs. 3 and 4, as in Fig. 1, single webs are shown by a double line and webs travelling together but not adhesively joined are separated by a line, but webs adhesively joined are shown by two lines and the component webs are not separated by a line, thus indicating that the adhesively joined webs constitute, in effect, one web.

It will be evident, on inspection, that the device illustrated in Figs. 3 and 4 can be used without modification for joining only two webs, instead of three. In the device of Fig. 3, for example, a duplex laminated web can be made by omitting either web 62 or web 63. Web 61 would then be adhesively combined in the nip between rolls 72 and 75 with either web 63 or web 62, and the combined duplex web could then be passed around roll 75, completely by-passing roll 76 and adhesive applying unit 77. In the device illustrated in Fig. 4, a duplex web can be produced by omitting web 91, and threading web 92 from roll 88 directly to the nip between rolls 101 and 102, by-passing roll 89 and adhesive-applying device 100. It will be noted that this device then becomes identical with that illustrated in Fig. 1. Alternatively web 92 may be omitted and webs 91 and 93 adhesively combined in passing around roll 105.

It will be obvious that the present invention can also be adapted to the combining of more than three webs, if desired, so long as the principles of the invention are borne in mind and so long as the rolls around which the combined web must pass are large enough with regard to the thickness and flexibility of the combined web that no undue strain is placed upon the web in flexing around these rolls.

I claim:

1. Method of pasting two webs of paper together, back to back, which comprises: continuously passing the two webs together, back to back, between rolls under pressure, prior to the application of adhesive therebetween; conducting the two webs along separate paths after the said passage between rolls; then, where the two webs are following said separate paths, continuously applying in excess of liquid adhesive composition to the back of one of said webs, and immediately thereafter doctoring off the surplus adhesive composition therefrom; holding the web under high and substantially uniform tension where said applying and doctoring operations take place; reuniting the adhesive coated web with the other web, while both are held under said high and uniform tension and against the surface of a roll; then passing the combined web around and between heated rolls held together under pressure.

2. Method of claim 1 wherein the tension on the web at the location where the liquid adhesive is applied to the web and doctored, is maintained at its high and substantially uniform value by passing both webs between rolls before and after the application of adhesive and applying the power for rotating all of the rolls through the roll last contacted by the web in its travel.

3. Method of making laminated paper webs which comprises: continuously passing the webs through a plurality of nips between superposed rolls, under pressure; driving the roll above the paper, in each case, by friction transmitted through the paper from the roll below; driving the roll below the paper, in each nip except the last, by power transmitted by friction from a roll above the paper in the next succeeding nip through which it passes; conducting each but one of the webs, in turn, after it has passed through at least one of said nips, and before it passes through the succeeding nip, along a predetermined independent path; then where said web is following said independent path, continuously applying an excess of liquid adhesive composition to one side thereof, and immediately thereafter doctoring off the surplus adhesive therefrom; then, in turn, adhesively uniting each web to which adhesive has been so applied, before it has passed through the succeeding nip, with another web, while both are held under high and uniform tension and against the surface of a roll; and thereafter passing the combined web around and between rolls held together under pressure.

4. A device for laminating webs of paper and the like, which comprises: a stack of rotatable smooth surfaced metallic rolls, the lowermost of which is supported on its journals, and supports, at least in part, the weight of all superposed rolls, whereby rotation of said lowermost roll will be transmitted by friction to each of the superposed rolls; means for guiding a plurality of webs to be laminated into said stack; means for individually controlling the tension on the several webs entering said stack; adhesive-applying devices, at least as many in number as the maximum number of webs to be combined, less one, adjacent to said stack of rolls, each of said devices comprising a trough for holding liquid adhesive, a rotating roll dipping into the adhesive contained in said trough, and a round edged doctor blade; a fly roll corresponding to each of said adhesive-applying devices, so located that the corresponding adhesive-applying device lies between said fly roll and said stack, and so located that it is adapted to guide a single paper web over and in contact with the rotating dipping roll and then over and in contact with the round edge of the doctor blade; means for internally heating at least one of the rolls in said stack, and means for conducting a laminated web from the lowermost nip in said stack.

5. A device for laminating web of paper and the like, which comprises: a stack of rotatable smooth surfaced metallic rolls, the lowermost of which is supported on its journals, and supports, at least in part, the weight of all superposed rolls, whereby rotation of said lowermost roll will be transmitted by friction to each of the superposed rolls; means for guiding a plurality of webs to be laminated into said stack; means for individually controlling the tension on the several webs entering the stack; a fly roll over which one of said webs can be withdrawn from one nip in the stack and fed into a lower nip; an adhesive-applying device comprising a trough for holding liquid adhesive, a rotating roll dipping into adhesive contained in said trough, and a round edged doctor blade, said adhesive-applying device being located between said fly roll and said stack whereby a web in passing between said fly roll and said stack passes over and in contact with said dipping roll and immediately thereafter passes over and in contact with the round edge of said doctor; means for internally heating at least one of the rolls in said stack; and means for conducting a laminated web from a lower nip in said stack.

6. A device for continuously pasting two webs of paper together, back to back, which comprises: at least three metallic rolls arranged in superposed relationship and all supported, at least in part, on the journals of the lowermost roll, whereby rotation of the lowermost roll will cause the overlying rolls to be rotated by friction; means for guiding the two webs, back to back, between two of said rolls; means for guiding the two webs along separate paths after they emerge from between said two rolls; means along the path of one of said webs for applying an excess of liquid adhesive composition to the back of said web; means, immediately adjacent thereto for removing surplus adhesive from said web, prior to the passage of said webs through a lower nip between two of said superposed rolls where the two webs are adapted to be pressed together; means for heating at least one of the rolls contacted by the combined web; and means for conducting the combined web away from the nip between two of said rolls.

7. A device for continuously pasting two webs of paper together, back to back, which comprises: a driven metallic roll rotatably mounted in a substantially horizontal position and supported on journal bearings; a plurality of rotatable metallic rolls arranged parallel to said roll, superposed thereon and at least partially supported thereby, whereby said rolls will be rotated by rotation of said lowermost roll; a plurality of rolls positioned to direct the two webs, back to back, into the nip between two of said superposed rolls, above the middle of the stack; at least one roll positioned to lead the two webs along separate paths after they emerge from said nip; means for applying an excess of liquid adhesive composition to the back of one of said webs while traveling along its separate path; means for doctoring the surplus adhesive composition off of the back of said web; the aforesaid rolls being so arranged that said webs are reunited back to back on the surface of a roll and passed between rolls below the aforesaid nip; means for internally heating at least one of the rolls around which the combined web passes; and means for withdrawing the combined web from the final nip.

8. A device for continuously pasting two webs of paper together, back to back, which comprises a stack of rotatable smooth surfaced metallic rolls arranged in superposed relationship and all supported, at least in part, on the journals of the lowermost roll, whereby rotation of said lowermost roll will be transmitted by friction to the superposed rolls; two unwinders with adjustable brakes from which two webs of paper may be supplied; a plurality of freely rotatable rolls for conducting said webs from said unwinders to pass together, back to back, through the nip between the uppermost rolls in said stack; rolls positioned to direct said webs along separate paths as they emerge from between said two rolls; means for applying an excess of liquid adhesive composition to the back of one of said webs as it passes along said separate path; a doctor adjacent thereto for removing surplus adhesive composition from the back of said web; said rolls being so positioned that said webs may be reunited back to back on the surface of one of said rolls, and directed therefrom into the next lower nip in said stack; means for internally heating at least one of the rolls adapted to contact the combined web; and a winder for withdrawing the combined web from the stack and winding it into the form of a roll.

9. The device of claim 8 wherein the excess of liquid adhesive is applied to the back of the paper web by a roll dipping in a trough containing liquid adhesive composition and wherein means are provided for wiping the adhesive from the roll for a short distance each way from each edge of the web whereby a narrow strip at each edge of the web may be left free from adhesive.

References Cited in the file of this patent

UNITED STATES PATENTS

| 1,864,950 | Schweitzer | June 28, 1932 |
| 1,986,961 | Dodge | Jan. 8, 1935 |
| 2,136,739 | Grant | Nov. 15, 1938 |
| 2,330,530 | Tuttle | Sept. 28, 1943 |
| 2,334,485 | Ettl | Nov. 16, 1943 |
| 2,428,385 | Reynolds | Oct. 7, 1947 |
| 2,433,965 | Upson | Jan. 6, 1948 |
| 2,597,006 | Koenig et al. | May 20, 1952 |
| 2,635,509 | Cowie et al. | Apr. 21, 1953 |
| 2,680,468 | Lewis | June 8, 1954 |

FOREIGN PATENTS

| 515,011 | Great Britain | Nov. 23, 1939 |